UNITED STATES PATENT OFFICE.

THEODOR MEYER, OF AMÖNEBURG, ASSIGNOR TO H. & E. ALBERT, OF BIEBRICH-ON-THE-RHINE, GERMANY.

PROCESS OF MAKING ALKALINE PHOSPHATE.

SPECIFICATION forming part of Letters Patent No. 504,453, dated September 5, 1893.

Application filed March 9, 1892. Serial No. 424,334. (No specimens.)

*To all whom it may concern:*

Be it known that I, THEODOR MEYER, a subject of the Emperor of Germany, resident at Amöneburg, near Kastel, Germany, have invented new and useful Improvements in the Manufacture of Phosphates of Alkalies, of which the following is a specification.

It has heretofore been tried to decompose alkali-sulphate by means of an acid solution of calcium phosphate, but this process is not adapted to be used practically.

The process which is the subject of the present invention has the great advantage, that the gypsum is deposited in a condition which allows of the very easy separation from quite concentrated solutions of phosphates. I have found that the lime which is to bind the sulphuric acid, must not be used in a solution, as is the case when it is used in the form of acid phosphate of calcium, as in that case the gypsum forms a very bulky precipitate. But if the lime is used in an insoluble form, as a carbonate, the gypsum is deposited as a fine granulated deposit from which the solution may easily be separated by decantation or filtration.

The operation is as follows: A tank lined with lead and provided with an agitator is partly filled with a measured volume of a solution of phosphoric acid of known strength. In this a corresponding quantity of potassium, or ammonium or sodium sulphate, is dissolved, and then the calculated quantity of the finely pulverized chalk or calcium carbonate is added while constantly stirring the mixture, heating not being necessary. As soon as the chemical reaction is completed, the solution of phosphate is separated from the gypsum by means of filter presses, centrifugal machines or the like, and boiled down to the consistency of sirup. By subsequent drying, the salt is obtained as a hard solid body, which can be easily pulverized by disintegrators, or the like.

Instead of pure chalk, a phosphate containing chalk (lime) may be used, such as is known by the name of *craie grise*, and is found in large quantities in northern France, Belgium, and other localities, and,—as the phosphoric acid can hardly be utilized on account of the high percentage of lime—can be had at a very low price. By this process the chalk of the phosphate is partly converted into gypsum, and its insoluble phosphoric acid may now be rendered soluble with a less quantity of sulphuric acid than is usually necessary. Consequently the mineral thus obtained is more valuable and is good material for the manufacture of superphosphates of potash or of ammonia, without requiring the previous removal by washing of any alkali phosphate that may still adhere to it, or it may be used for obtaining the phosphoric acid necessary for this process, by extraction with sulphuric acid in which case the small quantities of alkali phosphate are again introduced into the process; the same is the case with the small quantities of phosphoric acid, which, owing to the presence of iron and alumina compounds form an insoluble deposit with the same. By thus avoiding the further washing and boiling down of the liquid obtained, without loss of material, the use of this phosphate containing chalk is a decided advantage.

What I claim is—

The process of obtaining phosphates of alkali which consists in treating a sulphate of alkali with phosphoric acid in the presence of carbonate of lime at a low temperature, thereby depositing the gypsum in a form in which the solution of phosphate may easily be filtered from it, substantially as described.

In testimony whereof I have signed my name to this specification in the presence of two subscribing witnesses.

THEODOR MEYER.

Witnesses:
RUDOLPH SEIDEL,
CARL ED. HAHN.